No. 754,426. PATENTED MAR. 15, 1904.
I. W. COLBURN.
GLASS WORKING MACHINE.
APPLICATION FILED MAY 24, 1899. RENEWED JULY 31, 1903.
NO MODEL. 4 SHEETS—SHEET 1.

No. 754,426. PATENTED MAR. 15, 1904.
I. W. COLBURN.
GLASS WORKING MACHINE.
APPLICATION FILED MAY 24, 1899. RENEWED JULY 31, 1903.
NO MODEL. 4 SHEETS—SHEET 2.

Witnesses:
J. M. Fowler Jr.
B. M. Offutt

Inventor:
Irving W. Colburn,
by Henry H. Bates,
Attorney.

No. 754,426. PATENTED MAR. 15, 1904.
I. W. COLBURN.
GLASS WORKING MACHINE.
APPLICATION FILED MAY 24, 1899. RENEWED JULY 31, 1903.
NO MODEL. 4 SHEETS—SHEET 3.

Fig. 4.

Witnesses:
J. M. Fowler Jr.
B. M. Offutt

Inventor:
Irving W. Colburn:
by
Henry H. Bates,
Attorney.

No. 754,426. PATENTED MAR. 15, 1904.
I. W. COLBURN.
GLASS WORKING MACHINE.
APPLICATION FILED MAY 24, 1899. RENEWED JULY 31, 1903.
NO MODEL. 4 SHEETS—SHEET 4.

Witnesses:
J. M. Fowler Jr.
B. M. Offutt

Inventor:
Irving W. Colburn
by Henry H. Bates,
Attorney.

No. 754,426. Patented March 15, 1904.

UNITED STATES PATENT OFFICE.

IRVING W. COLBURN, OF TOLEDO, OHIO.

GLASS-WORKING MACHINE.

SPECIFICATION forming part of Letters Patent No. 754,426, dated March 15, 1904.

Application filed May 24, 1899. Renewed July 31, 1903. Serial No. 167,804. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for carrying into operation a new mechanical method of rolling, pressing, and stretching plastic glass into sheets for the purpose of manufacturing plate and window glass. In carrying the said method into practical operation I first take a prescribed quantity of glass made fluid by the influence of heat either in a melting-tank or otherwise, or I cause the molten glass to flow directly from the melting-tank to the rolling or casting table, such as is now used in the ordinary manufacture of cast sheet or plate glass. Here it is spread evenly over the said table in a plastic condition, when a massive metal roller is passed over the same in the usual manner, thereby flattening the plastic glass to a sheet of uniform thickness. So far the operation does not differ materially from that in common use; but instead of proceeding to cool and anneal the said plate and to finish the same into transparent plate-glass by the ordinary laborious processes of mechanical grinding and polishing I subject it to the various successive steps of treatment now about to be described in connection with the mechanism and apparatus herein set forth, illustrated by the accompanying drawings, constituting my said invention, in which—

Like letters and numerals of reference refer to like parts.

Figure 3:
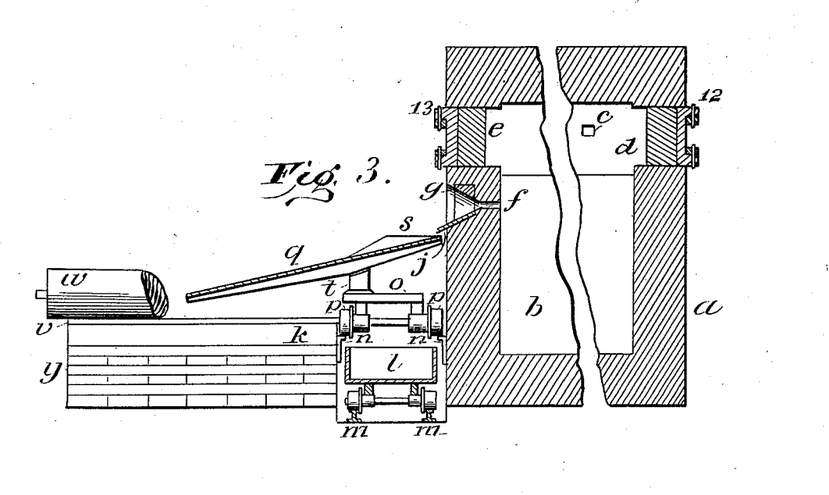
Fig. 3 is an end elevation, partly in section, of the melting tank or furnace with the middle portion broken out to economize space in the drawing, the swiveled traveling delivery-spout, the water-car for refuse glass, the casting-table, and roll.

Referring to the drawings, $a$ is a glass-melting tank shown in front elevation and also in part in horizontal and vertical section. *b* represents the melted glass in said tank. The tank has flame-ports in its parallel side walls toward the rear for the introduction of the heating means, the melting being preferably done with gas by the regenerator process. One of these ports is shown for illustration at *c*, Fig. 3.

*d* is a charging-hole in the rear wall of the tank, provided with suitable appliances 12 for opening and closing the same. *e* is a similar opening in the front wall of the tank, also provided with means 13 for opening and closing the same.

*f* is an aperture through the front wall of the tank, located below the general level of the melted glass in the tank. It has a flaring enlargement *g* toward the front, preferably conical in form. Said aperture is suitably protected against undue wear by a metallic casting *h*, surrounding the same, embedded in the substance of the refractory wall of the tank and firmly anchored in position by lateral wings *i i*. A portion of said casting projects at *j*, forming a spout for the conveyance of the molten metal, and said spout may be separate or integral, as desired, and it may be made of refractory material, such as fire-clay, when separate, if preferred.

Directly in front of the delivery-aperture of the tank is located the casting-table *k*, with a suitable interspace between. In this interspace is located the traversing water-car *l*, mounted on wheels running on a trackway *m m*, on which it can be removed or replaced at will. At a suitable height above said trackway is located a second trackway *n n*, preferably bracket-rails affixed to the respective walls of the casting-table and the tank. On this upper trackway traverses the car or carriage *o*, mounted on wheels *p p*, upon which carriage is mounted the swiveled conducting and distributing spout *q*, which traverses back and forth to a limited extent in front of the spout *j* and also has a circular sweep sufficient, in conjunction with its lateral range of travel, to enable it to deliver molten glass from the furnace to any part of the casting-table. The bracket-rails *n n* are provided with suitable stops or "bunters" 10 11, which restrict the range of travel of the wheels *p p* within the proper limits. Said distributing spout or trough *q* is formed with a fan-like terminus *s* at the end next the tank and is preferably mounted by means of a boss *t*, taking bearing upon the traversing car *o* and confined thereto by a suitable center bolt *u*. The said spout may be lined with refractory material, such as fire-clay, for better protection against the heat of the molten glass distributed thereby, if desired.

The casting-table *k* is mounted on a suitable permanent foundation *y*, preferably of brickwork or masonry, and has the usual side strips *v v*, which fix and regulate the thickness of the sheet of plastic glass cast upon the said table. These strips are preferably made removable and changeable to provide for casting sheets of different thickness, as required. The heavy roller *w*, which is passed over the plastic plate to flatten it, is made long enough to rest upon said strips or ledges in its passage.

At *x*, to the right of the table, is shown a platform for the roll to rest upon when not in use. The said roll is operated in practice by any of the customary appliances for the purpose, which being well known and not of this present invention are not herein illustrated.

Closely adjacent to the casting-table is erected the reheating-oven, the foundation of which, *z*, is made of substantial brickwork. 14 is the lower portion of the oven proper, and 15 is the top portion separated from the lower portion by an interspace sufficient to allow the glass plates to be carried through the oven on horizontal carriers presently to be described. Said top portion is supported by means of the uprights 16 and the projections 17, to which said uprights are affixed. The bottom portion 14 has cross-bars 18 across the top laid about flush with the top of the casting-table and spaced so as to permit the flame from below to play freely on the plastic-glass plate. Flame from above also has free access to the sheet of glass on its top surface. The lower portion 14 carries channeled side projections 19, Fig. 2, which act as a support for the endless sprocket-chains 20 20, presently to be described.

Extending from the reheating-oven to the upright main girders 21 22 are horizontal metal bars or plates 23, which support a series of bearings or boxes 24, in which run the journals of a series of rolls 25 25. They also support the bearings for roll 26 on a higher plane, the functions of which rolls will be presently described.

Figure 11:
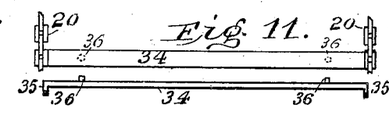
Fig. 11 is a detail view showing a portion of the horizontal carrier-chain and one of the carrier-bars to said chain from beneath; also an edge view of said carrier-bar.

21 22 are the upright columns, preferably I-beams, which constitute the main frame and support of the drawing mechanism. Projecting laterally from and beyond said main columns are the bearings 27 for the journals of sprocket-wheels 28 on the ends of shaft 29, over which run the sprocket-chains 20 20, before mentioned. These sprocket-wheels are operated by the hand-winch 30. At the opposite extremity of the reheating-oven and secured thereto at the same level are similar bearings 31, which sustain the journals of shaft 32, carrying sprocket-wheels 33 33, over which the endless sprocket-chains 20 20 pass at this end. These sprocket-chains carry at a given point a metal cross-bar 34, (see Figs. 11 and 12,) formed with downturned ears 35 35 at the extremities pierced for rivets, so as to take the place of side links of the sprocket-chains at the place where said cross-bar is attached. Said bar thus moves with the chains as a part thereof. The bar has upright projections or pins 36 36 on its upper side, the function of which will be later described.

Figures 5, 6, 7, 12:
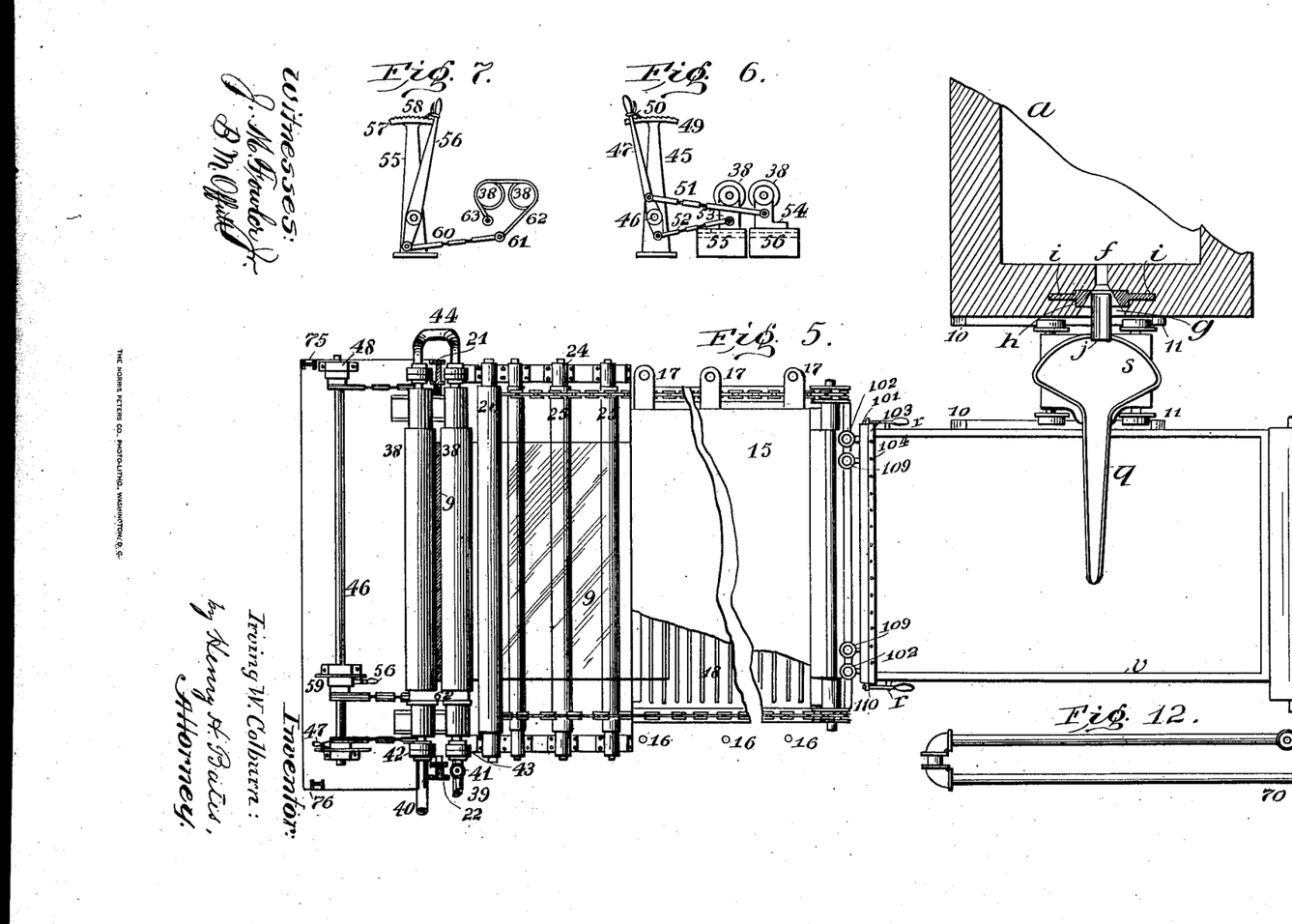
Fig. 5 is a plan view, partly in section, showing the main frame, the drawing and compressing apparatus, the horizontal carrying apparatus, the reheating-oven, its middle portion broken away, the casting table and roller, the traveling delivery and distributing spout, the front portion of the melting-tank in section, showing the outlet for molten glass, &c.
Fig. 6 is a side elevation showing the details of the mechanism for opening and closing the rolls and applying different degrees of pressure to the sheet of plastic glass under treatment.
Fig. 7 is a side elevation of the mechanism for applying regulated frictional resistance to the compressing-rolls, whereby the latter are endowed with the drawing function.
Fig. 12 is a plan view showing the pipe circulation for the cooling appliances shown in section and elevation, respectively, in Figs. 1 and 2.

The main frame, of which the most important elements are the upright columns 21 22, has the function of supporting the components of the compressing, drawing, stretching, and cooling apparatus. It is very lofty to afford room for the required operations and carries immediately above the sprocket-chain supports before mentioned a platform 37, which is the main working platform. Convenient to this platform are the compressing-rolls 38 38, journaled at both ends in suitable boxes carried on movable standards 53 54, traversing in ways 55 56, suitably supported on the main uprights or columns 21 22. These rolls are arranged so as to revolve with more or less freedom as controlled by frictional appliances presently to be described, the impulse of rotation being imparted by the movement of the plastic glass under treatment passing between them. Said rolls are supplied with internal cooling means, being hollow and furnished with a water circulation, as shown in Fig. 5, where 39 40 are inlet and outlet pipes, respectively, the water-supply being under control by means of the valve 41, said pipes being connected to the rotary rolls by rotary couplers 42 43 and the circuit being completed at the opposite ends of the rolls by the flexible juncture 44, united to the rolls by similar rotary couplers. Upon the platform 37 is located the mechanism for opening and closing the rolls and regulating the degree of compression produced thereby, consisting of the standard 45, in which is supported the rocking shaft 46, operated by hand-lever 47, said shaft being supported at the other end by taking bearing in upright 48. On top of the standard 45 is the curved rack 49, with which a locking-pawl 50 on the hand-lever 47 engages to hold the latter in any required position. At the lower end of the said hand-lever, at equidistant points above and below the pivotal shaft 46, are pivotally connected the extensible link connections 51 52, provided with turnbuckles, by which their lengths are enabled to be readjusted. Said link connections are pivotally connected at the other ends, respectively, with the movable roll-standards 54 53, by which means the movement of the hand-lever approximates or separates the standards and with them the rolls simultaneously toward or from a fixed central plane. A similar rocking lever and link connections are borne on the other extremity of shaft 46, operating on similar movable standards supporting the bearings for the rolls at that end. Upon the platform 37 is also located the mechanism for controlling the rotational movement of the rolls by frictional means, consisting of the standard 55, supporting the rocking lever 56. The standard 55 has on its top the curved rack 57, situated on the upper surface, with which serrations the locking-pawl 58 on the hand-lever 56 engages to maintain the said lever in the desired position in which it may be placed. The said rocking hand-lever is not attached rigidly to the shaft 46; but the latter passes loosely through the lever at the point 59, affording a fulcrum for the lever to move on without interfering with the functions of the shaft. To the lower arm of the said lever is pivotally attached the link connection 60, provided with a turnbuckle extension means to render it adjustable for length. The outer end of said link connection at 61 is secured to a flexible band or brake-strap 62, which passes around both of the rolls 38 38, Figs. 5, 7, and is secured at 63 to a fixed point beneath roll 38. This frictional band has sufficient slack to enable the rolls to be opened to their widest extent when the respective hand-levers controlling said rolls and brake-strap are operated.

Figures 1, 8, 9, 10:
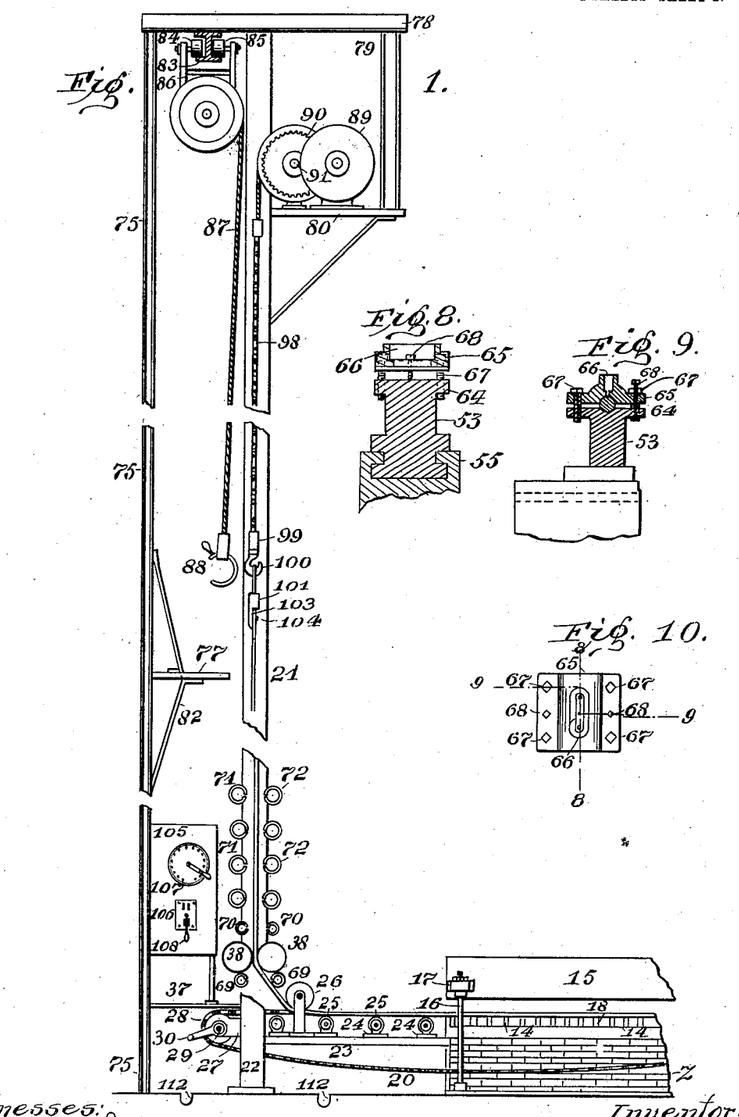
Figure 1 is a side elevation of the drawing, compressing, and stretching apparatus, partly in section, broken in two places, showing also a portion of the reheating-oven and the horizontal carrying apparatus.
Fig. 8 is a transverse sectional view, taken on line 8 8 of Fig. 10, of one of the standards which support the bearings for the compressing-rolls, showing the means for regulating and adjusting the amount of compression of said bearings.
Fig. 9 is a sectional view, taken on line 9 9 of Fig. 10, of one of the standards which support the bearings for the compressing-rolls, taken at right angles to the section of Fig. 8.
Fig. 10 is a plan view of the cap-plate shown in Figs. 8 and 9.

Supplementary to the controllable friction means above described is the means shown in Figs. 8, 9, and 10 for adjustably regulating the revoluble freedom of the rolls. The standard 53, traversing in the slotted way 55, is expanded at the top, as at 64, Fig. 9, the seat of the roll-journal being between this expansion and the upper cap. The top portion of the journal-bearing is formed of the cap-plate 65, the same having an oil-well 66 formed centrally in its substance. Said cap-plate is adjustably held to the bottom portion of the bearing by four screws 67, but is regulated from taking too firm a grip on the journals by the set-screws 68, of which there are two. These set-screws are threaded into the cap-plate 65, but only take a bearing against the bottom portion of the journal-bearing, as shown in Figs. 8 and 9.

Directly beneath the rolls 38 38 are the perforated or slotted pipes 69 69, the perforations being directed inward, so as to project steam or water in fine jets inwardly for a purpose later to be described. Said water-pipes are supplied with means for a water or steam circulation. (Shown in plan in Fig. 12.) Directly above the rolls is a pair of similar pipes 70 70, similarly perforated and supplied with a circulation for a similar purpose. Above these pipes is arranged a series of similarly-perforated or slotted pipes 71 72 in pairs. These are supplied with means for sending cooling-currents of air through their perforations, consisting of an air-trunk 73, connected with an outer source of air-supply, and a regulating hand-valve 74.

In addition to the main columns or I-beams 21 22 are two smaller auxiliary columns 75 76. These furnish further support for the mechanism at the top of the apparatus and also afford support for the working platform 77, located at a higher point than main platform 37. 82 is a brace for said platform. At the top of the main frame are the cross-girders or I-beams 78, extending from small columns 75 76 to and beyond main columns 21 22 and affording support through hanger 79 to an upper platform 80. There is also a top cross-girder 81, connecting the tops of main columns 21 22. To the under side of cross-girders 78 is secured an I-beam 83, on the flanges of which run wheels 84 85, attached to a carrier 86, which carries a traveling motor, motor-shaft, rotary drum, and suspensory cords 87, terminated by attachable and detachable circular hooks 88 for carrying the completed sheet of glass out of the machine. As the construction and function of this portion of the apparatus forms no part of the present invention, no further description thereof is deemed necessary.

Figure 4:
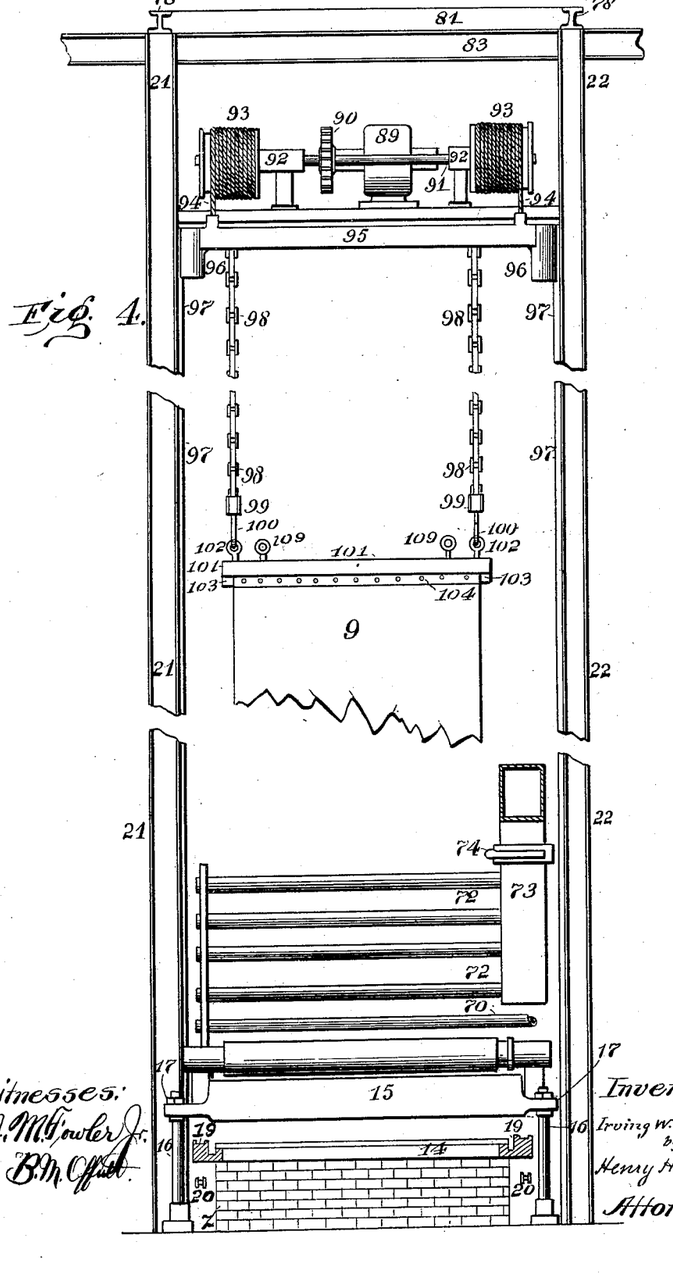
Fig. 4 is a front elevation of the drawing and stretching apparatus broken in two places to include essentials within the limits of the sheet, showing the main frame, the drawing mechanism, a portion of the suspended sheet of glass, the cooling means, the drawing and compressing rolls, and the reheating-oven.

On the platform 80 is located a motor 89, preferably electric, receiving energy from an outside source through conductor-wires concealed in the framework of the machine. Said motor has a rotary armature connected by a train of gearing 90 with a rotary shaft 91, mounted in suitable bearings 92 92 and carrying rotary drums 93 93, on which wind and unwind the cords, bands, or chains 94 94, which cords are attached at their outer ends to the horizontal bar 95, having at its ends guide-blocks 96 96, which engage with vertical ways 97 97, formed upon or secured to the upright main columns 21 22. To this horizontal bar 95 are secured cables, ropes, or chains 98 98, which may be sprocket-formed, as shown in Figs. 1 and 4. At the lower ends of these cables or chains are attached the blocks 99 99, to which are secured the strong hooks 100 100. Detachably suspended from these hooks is the bar or plate 101 by means of eyebolts 102 or suitable similar devices. The bar 101 is formed with a rabbet 103 and pins 104 at intervals projecting from the rabbeted surface. 9 is the sheet of glass suspended from the bar 101 by chains 98.

On the main platform 37 is located a switch-board 105, carrying a double-pole switch 106 and a rheostat 107, both located in the circuit-conductors which convey electric energy to the motor 89. The function of said switch is to enable the motor to be reversed, started, or stopped by means of its double-throw contact-lever 108. The rheostat is for enabling the speed and power of the motor-armature to be controlled and regulated, and it may also serve to turn the current on or off from the motor, if desired.

112 112 are drainage-channels located in the floor to draw off any water accumulating.

The object of the port $d$ at the rear of the tank is to afford a means for charging the tank with materials and in the proper proportion for making glass of the quality desired. The port $e$ in front, with its door 13, furnishes access to the front of the tank to examine the condition of the melted glass and to remove floating impurities from the surface thereof when necessary. The object of the reheating-oven is to restore to the cast and chilled glass the required degree of plasticity to enable it to undergo the subsequent operations. The series of rolls 25 serve as a level antifriction-support for the plastic sheet of glass when being conveyed from the reheater to the drawing and stretching apparatus. The more elevated guide-roll 38 serves to keep the plastic sheet in the proper position during its change of direction from the horizontal to the vertical position preparatory to compressing, drawing, and stretching.

The object of the endless sprocket-chains 20 20 and the sprocket-wheels and winch to operate them, with the carrier cross-bar 34, is to enable the cast and rolled sheet of glass to be drawn off from the table and into the reheating-oven, where it can be simply annealed, if desired, by a suitable arrangement of the heating means and sold as rough plate, or in case it is to be finished into transparent plate or sheet glass it can be transferred to the drawing and stretching apparatus. The object of the bar or plate 101, with its rabbeted edge or face 103 and projecting pins 104, is to afford a means for securing attachment to the plastic sheet of glass while being rolled, by which said sheet can be safely drawn off from the casting-table into the reheating-oven and by which it can afterward be drawn through the compressing and stretching apparatus. The said bar lies primarily at the extreme edge of the casting-table toward the reheating-oven with its rabbeted face and projecting pins upward, as shown in Fig. 5, forming a ledge to the casting-table at that end. It is held securely in place by swinging clamp-hooks $r$, affixed to the edge of the casting-table and catching over pins 110, projecting from the end of bar 101. When the roller comes over the previously-poured plastic glass, it presses the same over and upon the rabbeted face of bar 101 and around the upward-projecting pins 104, and at the same time the glass becomes slightly chilled, thereby assuming a firm adhesion which enables it to be drawn off the table by the bar 101 and to sustain the subsequent drawing and stretching strains to which it is subjected. To enable the bar to be engaged with these several appliances, it is furnished with two sets of eyebolts, the inner ones, 109 109, being in alinement with and designed to catch over the upright projecting pins 36 on the cross-bar 34, whereby the bar 101, with its attached glass, is uniformly drawn forward into and through the heating-space of the reheating-oven as the winch 30 and the sprocket-chains 20 are operated. The outer eyebolts 102 102 are suitably placed so as to be engaged by and in proper alinement with the hooks 100 on the ends of the drawing-chains 98, which are brought into engagement with the said eyebolts later when the time comes to draw the plastic sheet up through the compressing and stretching mechanism.

The compressing mechanism is embodied in the rolls 38, which by means of the apparatus shown in detail in Figs. 5 and 6 can be regulated and controlled as to the degree of compression exerted on the glass by the operator standing on platform 37. The rolls take their motion of rotation from contact with the plastic glass passing between them under compression; but the freedom with which the glass is allowed to pass is regulated in two ways—first, by the hand-controlled brake apparatus, (illustrated in Figs. 5 and 7,) by which a graduated retarding force is applied to the rolls in accordance with the work in hand, and, second, by the frictional appliances on the bearings of the rolls. (Illustrated in Figs. 8, 9, and 10.) By these means the rolls have imparted to them a double function, acting not only as compressors and flatteners of the plastic sheet, but as drawing-bars, exerting frictional retardation thereon as it is drawn forcibly upward by the operation of the drawing and stretching mechanism. The degree of stretching can thus be regulated to a nicety by the operator, and on this skilled regulation the perfection of the result in large measure depends.

The function of the steam and water spraying pipes 69 70 is to abstract some of the surplus heat of the plastic sheet just before and just after it enters the compressing and drawing mechanism. The jets of water or steam are directed against the surface of the plastic glass on both sides and rapidly reduce it to the required viscosity.

The series of air-cooling pipes arranged higher up in the course of the plastic sheet are for the purpose of cooling and setting the glass after it has attained the requisite degree of tenuity and transparency under the stretching operation. The cooled and set portion of the glass sheet thus furnishes support and lifting power to the plastic glass below not yet entirely stretched to completion.

The stretching operation is effected through the medium of the motor 89, drums 93, and chains 94, heretofore described, said motor being under perfect control of the operator on platform 37 by means of the switch 106 and regulating-rheostat 107.

Operation: I will now describe one cycle of operation of the apparatus in making a single casting from the tank into merchantable glass, either of rough plate or smooth transparent and polished plate, sheet, or window glass. Different batches of raw new material and broken glass have been supplied to the glass-melting tank at the door at the feeding end of the tank, and heat has been applied until the tank is full of melted glass to the extent required for proper working and in proper working condition, melted glass being at the correct height in the glass-melting tank. At the back end the operation of melting is still going on. At the middle of the glass-melting tank the mixing and refining of the glass is taking place, and at the forward end the refined glass has been slightly cooled to the correct heat for best working and is in the best condition for drawing a charge or gathering of melted glass from the tank. The aperture $f$ has been previously sealed with moist fire or pot clay or similar material, which has become hard and resists the passage of melted glass from said aperture. It is now desired to obtain a charge or gathering of molten or fluid glass from the tank. The car $o$, carrying the distributing-spout $q$, is in the position shown in Fig. 2. The car $l$ is also in the position shown in Fig. 2. The aperture $f$ is broken open with a long metal rod until it offers a free passage for the melted glass. Immediately melted glass flows from the glass-melting tank. With the first flowing comes the refuse fire or pot clay used to seal the said aperture. This runs over the spout $j$ and drops into the car $l$, supplied with water for cooling this refuse glass, which glass can afterward be melted over and refined, if desired. Immediately after the first flow of melted glass the metal runs clear and refined from below the surface, where it is free from all scum, dirt, &c., and in best condition for a casting of a plate of glass. As soon as clear, clean, and refined glass commences to flow the car $o$ is pushed along the track until it comes in contact with the stops or bunters 11 to the right. These stop the car in the correct position for receiving the flowing melted glass upon the distributing-spout $q$, which is now in the position shown in Fig. 5. The melted glass enters the said spout at the broad fan-like portion $s$ and flows down the spout until it reaches the discharging end. By giving the spout a reciprocating motion the fluid or molten glass is properly distributed over the casting-table. When the proper quantity of fluid or molten glass is collected upon the casting-table for a casting of the desired size and thickness of plate about to be produced, the flow of glass from the glass-melting tank is stopped. This is done, preferably, by a mass of fire or pot clay applied moist on the end of a long wooden pole in a manner similar to that in which the flow of iron from an iron blast-furnace is arrested. Other means for stopping this flow of glass are practicable, such as a hinged iron door or clay door, and I therefore do not wish to be limited to this precise mode of opening and closing the aperture $f$. As soon as the moist pot or fire clay has been plunged into the said aperture it becomes baked and sufficiently hard to arrest and keep in check the fluid glass in the glass-melting tank until the next casting is desired. When the flow of glass ceases, the car $o$ is run along the track until it comes into contact with the stop-motion or bunter blocks 10.

Figure 2:
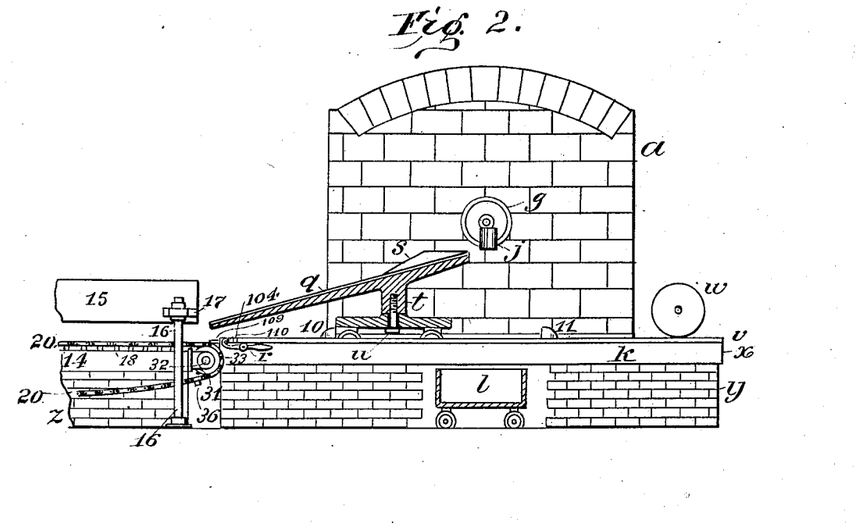
Fig. 2 is a front elevation of the glass-melting tank, from which the molten glass is drawn, showing also the casting-table in elevation, the traveling delivery-spout, the water-car for receiving refuse glass, the roll for flattening the charge of plastic glass, and a portion of the reheating-oven and horizontal carrier.

The spout 17 is then swung to one side, as in the position shown in Fig. 2. The heavy metal roll $w$ is then passed over the entire length of the casting-table and back to its position as shown in Fig. 5. This operation rolls the glass, which has now become plastic, into a plate or sheet. The thickness of this plate of glass is determined by the thickness of the gage-bars $v\ v$, which are fixed along the sides of the casting-table. This action of the roll $w$, besides determining the thickness of the plate of glass and rolling it to a comparatively even thickness and surface, has rolled the plastic glass to and upon rabbeted face 103 of the bar 101 and at the same time has rolled the plastic glass around the pins or projections 104, making proper contact when slightly chilled to hold against the coming stretching, drawing, and pulling operation. As soon as the plate of glass has been completed upon the casting-table the clamps $r$ are released from the pins 110, by which the plate or bar 101 was previously restrained, thus placing the said bar with its attached plate of glass in readiness to be drawn off from the casting-table into the reheating-oven. An attendant now turns the handle or winch 30, thereby operating shaft 29, sprocket-chains 20, and bar 34, which had previously been run back, so as to bring bar 34 and its pins 36 into position for operation, as shown in Fig. 2, and bringing said bar, with its pins, up directly under the eyebolts 109 109, engaging the latter, so as to be ready to draw off the glass plate as the winch continues to be revolved in the forward direction. The pins now being firmly entered into the eyebolts, the clamps $r$ are released from bar 101, and by continuing the traveling of the sprocket-chains the plate of plastic glass is drawn off the casting-table into the reheating-oven. It might possibly be desired to simply manufacture a plate of glass that would be known as "rough" plate. In such a case the heating-oven could be made to serve the function of an annealing-oven, and the rough plate of glass when it comes from the said annealing-oven would be ready for further operations or for the market, as might be required. To this extent I would simply be taking advantage of my invention so far as it discloses the drawing of fluid or molten glass directly from the glass-melting tank, its distribution on the casting-table by means of the swiveled spout $q$, and the drawing of the plate of plastic glass from off the casting-table into the adjacent oven by means of its attached plate or bar 101, with the projecting pins 104 and the sprocket-chain mechanism in coöperation therewith. If it is not desired to stop the operation at this stage and the operation is to continue, then after proper reheating or firing of the glass sheet has taken place in the oven the plate continues on its passage until the bar 101 has arrived at a position between the girders 21 22. The rolls 38 38 have meantime been opened to their fullest or widest extent by means of the hand-lever 47 and its attached mechanism. The drawing-chains 98, with their attached hooks 100 100, have been lowered by reversal of the motor down between the air cooling-pipes 71 72, the water or steam cooling-pipes 70, the rolls 38 38, and the steam or water cooling-pipes 69 until they are sufficiently low to engage with the eyebolts 102 102. They are now hooked into these eyebolts 102 102, the motor is reversed by means of the reversing-switch, the winding-ropes are wound upon the drums 93 93, the hooks 100 are carried upward, and with them the bar 101 with its attached plate of plastic glass. As soon as the bar 101 has passed the rolls 38 38 water is turned onto the circuit through the said rolls by means of the valve 41, passing through the first roll, then through the flexible pipe 44, and back through the other roll to the outside of the machine. This serves to keep the compressing and drawing rolls at the proper temperature during the operation. Water or steam, as the case may demand, has been turned onto the pipes 69 and 70 in regulated amount, and air is turned into the pipes 71 72. The rolls are now by means of the lever 47 and its connecting mechanism brought into contact with the plate of plastic glass, the degree of pressure and contact being gaged at will and as desired. The hand-lever 56 has been previously relaxed to enable the rolls 38 38 to be thrown open for the passage of the drawing-cables. As soon as the sheet of plastic glass passes the rolls the said lever is thrown to the position illustrated in Fig. 7, at which position the friction brake-band comes into close contact with the recess or groove in the said rolls, Fig. 5, and this frictional contact of the brake-band serves to give the rolls a slipping or drawing motion over the plastic-glass sheet 9. This friction can be regulated as desired, depending upon the work in hand. If but little stretching is desired, a light friction is given. If much stretching and drawing is required, then a heavy friction is given. This friction enables the rolls to serve two functions. They act at once as a pair of compression-rolls and a pair of draw or pressure bars, which function I have heretofore separated. When the rolls 38 38 serve as compression-rolls only, they make only rough plate-glass. Then by applying the friction device illustrated in Figs. 5 and 7 they serve as rolls and pressure or draw bars combined, said pressure being variable at the will of the operator in control of the hand-lever 47. In case of a long run of one kind and thickness of glass being required then the frictional device illustrated in Figs. 8, 9, and 10 is used. The friction in this case is of the permanently-regulated type and can be set for any desired amount of friction. This is accomplished as follows: The four cap-screws 67 on each box or bearing cap are tightened against the pressure of the two set-screws 68, one on each side of the box or bearing, said screws 68 abutting against the bottom portion of the bearing, as heretofore described. By regulating the pressure of the four cap-screws on each bearing and the adjustment of the two set-screws on each bearing any degree of friction is obtained on the bearings of the rolls 38 38. These bearings are lubricated by oil supplied from the oil-receptacle 66, and a most satisfactory sliding friction is thus obtained. In this way the rolls are again made to serve as rolls and pressure or draw bars in combination. It sometimes happens that the functions of the rolls can be dispensed with entirely and glass be produced simply with the rolls acting as draw or pressure bars. To enable the rolls to perform this function, the set-screws 68 are loosened and the cap-screws 67 are tightened until the rolls or their bearings are so tightly clamped that they are not free to revolve in the least. The plastic-glass sheet passing through the rolls is then acted upon directly by frictional contact without the sliding rolling contact, and in that event the rolls answer as simple pressure-bars or draw-bars without any rolling action and in that way produce satisfactory plate and sheet glass for certain requirements. I do not, therefore, limit myself to rolls in rolling action, as the combined rolling and drawing function of these rolls extends from the zero limit of the drawing function to the zero limit of the rolling function, both functions being simply merged in one organization in this case. It is not even necessary that the rolls be circular when serving the drawing function exclusively, since they are interchangeable, and polygonal or faceted pressure-bars can be inserted when it is not necessary for the rolls to revolve.

It may be desired to take the plate of glass cast upon the casting-table and simply reduce it in thickness, the product in that case being known as "thin rough plate." In such a case the lever 56, Fig. 7, is open, the band-brake free from friction upon the rolls 38 38, and the bearings set loosely, so that the rolls revolve freely. The rolls then act by compression solely and should be brought into close contact with the plastic-glass plate 9 with sufficient force to produce the desired results. It is possible to use so much pressure with the hand-lever 47 alone as to create a drawing action on the plastic-glass sheet, in which case the production of rough thin plate-glass is defeated, and polished transparent glass is then the product by reason of the hardness of contact of the rolls with the sheet of glass. This hardness of contact necessitates an application of more force in getting the plate of glass through the rolls, and the result is the stretching of the still plastic sheet, thus producing thin transparent polished sheet-glass, as when frictional pressure-bars are used. It is preferable, however, when this finished product is desired to use the friction-brake band in connection with the natural friction produced by the rolls in contact with the plate of glass and the compression adjustment of the cap-screws on the boxes or bearings of the rolls. The operation continues until the entire plate of glass has passed from out the oven over the rolls 25, by the roll 26, by the rolls 38, the water and steam cooling-pipes 69 and 70, and the air cooling-pipes 71 72. I use air, steam, and water for cooling, as they are all convenient and cheap and possess different cooling degrees and products and are, moreover, most convenient to operate and regulate as to location, pressure, and quantity of discharge. When the different operations described are completed, whether at the stage of thin rough plate or polished transparent sheet-glass, the plate is ready to be taken out from the machine and be conveyed away to be cut up into commercial sizes, which, as it forms no part of the present invention, need not be here particularly described.

It will be seen that this invention is not limited to the operation of glass-stretching from a casting-table in conjunction with the procuring of glass direct from a melting-tank. The glass can just as well be procured from melting-pots brought to the casting-table and the contents poured thereon in the old way, the only difference being the greater costliness of the last-named method, both by reason of the extra labor required in taking the pots from the furnace and transporting them to the casting-table and also the occasional breakage of the pots in the operation of handling; nor is it limited to the precise mode of compressing and stretching the cast sheet shown in the drawings, since it might be more convenient in case simple compression were required to arrange the compression-rolls in alinement with the horizontal plane of the casting-table and the reheating-oven, or in case simple stretching were required the drawing and stretching means might also be located to act horizontally.

It will be seen that by stopping the operation at different stages and properly adjusting the parts for the different functions three different results in glass-making may be arrived at with the same substantial apparatus—viz., a thick or medium rough plate may be produced of merchantable quality, a thin rough plate compressed to the required thinness, and transparent polished glass in either thick or thin plates made clear and brilliant by the operation of stretching.

Having thus described my invention, the following is what I claim therein and desire to secure by Letters Patent:

1. In the making of sheet-glass, the combination of means for casting a flat blank of plastic glass, means for grasping said blank between frictional appliances, and means for forcibly drawing said blank through said frictional appliances, whereby the blank is stretched and attenuated into a polished sheet, substantially as specified.

2. In the making of sheet-glass, the combination of means for casting a flat blank of plastic glass, means for reheating said blank, means for removing said blank from the casting device to the reheating device, means for grasping said blank between frictional appliances, means for regulating the degree of pressure applied to said blank by the said frictional appliances, and means for forcibly drawing said blank through said grasping device, substantially as specified.

3. In the making of sheet-glass, the combination of means for casting a flat blank of plastic glass, means for compressing said blank by rolling pressure passively applied to both sides thereof, and means for forcibly drawing said blank through said compressing means, substantially as specified.

4. In the making of sheet-glass, the combination of means for casting a flat blank of plastic glass, means for grasping said blank by rolls passively rotating in contact therewith, means for forcibly drawing said blank through said grasping-rolls, and means for frictionally retarding the rotation of said rolls, whereby the plastic blank is drawn, stretched and attenuated by the drawing means, substantially as specified.

5. In the making of sheet-glass, the combination of means for casting a flat blank of plastic glass, means for reheating said blank, means for removing said blank to the reheating device, means for applying frictional pressure to both sides of said blank, and means for forcibly drawing said blank through said pressure devices, whereby it is stretched and attenuated, substantially as specified.

6. In the making of sheet-glass, the combination of means for casting a flat blank of plastic glass, means for applying frictional pressure to both sides of said blank, means for forcibly drawing said blank through said frictional devices, and means for projecting jets of cooling fluids on both sides of said plastic blank, substantially as specified.

7. In the making of sheet-glass, the combination of means for casting a flat blank of plastic glass, means for applying rolling frictional pressure to both sides of said blank, means for forcibly drawing said blank through said rolling frictional devices, and means for cooling said blank located on both sides thereof and on both sides of said frictional pressure devices, substantially as specified.

8. In the making of sheet-glass, the combination of means for casting a flat blank of plastic glass, means for reheating said blank, means for compressing said blank by frictional appliances, means for forcibly drawing said blank through said frictional appliances, and means for projecting jets of steam, water and air upon said blank, in proximity to the said frictional compressing appliances, substantially as specified.

9. In the making of sheet-glass, the combination of means for casting a flat blank of plastic glass, means for grasping said blank between rolls passively rotating in contact therewith, means for forcibly drawing said blank through said grasping devices, and means for frictionally retarding the rotation of said rolls, controlled by a hand-lever within reach of an operator, whereby the rotation of the rolls may be regulated or entirely stopped at will, and the plastic blank thereby drawn, stretched and attenuated to any required degree of tenuity, substantially as specified.

10. In the making of sheet-glass, the combination of means for casting a flat blank of plastic glass, means for grasping said blank between rolls passively rotating in contact therewith, means for forcibly drawing said blank through said grasping devices, and means for applying frictional retardation to the bearings of the said rolls, capable of preadjustment, substantially as specified.

11. In the making of sheet-glass, the combination of means for casting a flat blank of plastic glass, means for grasping said blank between rolls passively rotating in contact therewith, means for forcibly drawing said blank through said grasping devices, means for applying frictional retardation to said rolls controlled by a hand-lever, and means for applying frictional retardation to the bearings of said rolls independent of the lever-controlled means, substantially as specified.

12. In sheet-glass-making apparatus, a tank for containing molten glass, a casting-table, a trackway between said tank and said table, near the level of the upper surface of the latter, a traveling car on said trackway, and a swiveled spout on said car, extending over said table, of dimensions sufficient to reach any point on said upper surface, substantially as specified.

13. In sheet-glass-making apparatus, a tank for containing molten glass, a casting-table, a trackway between said tank and said table, near the level of the upper surface of the latter, a traveling car on said trackway, a swiveled spout on said car, extending over said table, a second trackway beneath and parallel to said upper trackway, and a water-car traversing on said lower trackway, substantially as specified.

14. In sheet-glass-making apparatus, a casting-table, a flattening-roller, a compressing means apart from said flattening means, a traction means for drawing plastic glass from the table into the compressing means, and a reheater interposed between the table and the compressing means, all substantially as and for the purpose specified.

15. In an apparatus for making sheet-glass, the combination of a casting-table, means for delivering plastic glass upon said table, means for flattening the glass into a plate or blank of uniform thickness, a reheating means, a means for transferring said blank from the casting-table to said reheater, means for compressing said plastic blank to reduce its thickness, and means for drawing, stretching and attenuating said reduced sheet to a state of clearness and transparency, substantially as specified.

16. In an apparatus for making sheet-glass, the combination of a casting-table, a reheating-oven in proximity thereto, means for removing a blank of plastic glass from the casting-table to said oven, a pair of passively-rotating compressing-rolls, means for regulating and controlling the degree of compression of said rolls, a bar 101 for making connection with the plastic-glass blank, a motor, and connections between said motor and said bar, whereby the blank of plastic glass is drawn through the compressing-rolls, substantially as specified.

17. In an apparatus for making sheet-glass, the combination of the bar 101, bar 34, chains 20, 20, sprocket-wheels 28, 33, rolls 24, 24, 26, compressing devices 38, 38, cooling devices 69, 70, 71, 72, drawing-chains 98, motor 89, rheostat 107, and reversing-switch 106, substantially as specified.

18. In sheet-glass-making apparatus, a tank for containing molten glass, a casting-table, a trackway between said tank and said table, near the level of the upper surface of the latter, a traveling car on said trackway, carrying a swiveled spout thereon, extending over said table, said spout having a fan-like receiving member s, substantially as specified.

19. In sheet-glass-making apparatus, a tank for containing molten glass, a casting-table, a trackway between said tank and said table near the level of the upper surface of the latter, a traveling car on said trackway, carrying a swiveled spout q, s, thereon, and stops or bunters 10, 11, to limit the extent of travel of said car on said trackway, substantially as specified.

20. In an apparatus for making sheet-glass, a casting-table, a reheating-oven in proximity thereto, a bar 101 having rabbeted face 103, pins 104, and eyebolts 109 in combination with chains 20, 20, bar 34, pins 36, and means for operating said chains, to draw the glass blank from said table into said oven, substantially as specified.

21. In an apparatus for making sheet-glass, the bar 101, having rabbeted face 103, pins 104 and eyebolts 102, in combination with hooks 100, chains 98, bar 95, guide-blocks 96, cords 94, winding-drums 93, and electric motor 89 for operating said drums, substantially as specified.

22. In an apparatus for making sheet-glass, the casting-table k, and clamp-hooks r r, in combination with bar 101, having rabbeted face 103, pins 104, eyebolts 102, 109, and pins 110, substantially as and for the purpose specified.

In testimony whereof I affix my signature in presence of two witnesses.

IRVING W. COLBURN.

Witnesses:
CHAS. H. LEMMON,
CHAS. C. LEWIS, Jr.